Feb. 12, 1957     M. R. LAITUR     2,781,084
VEHICLE SEAT CUSHION
Filed July 2, 1953
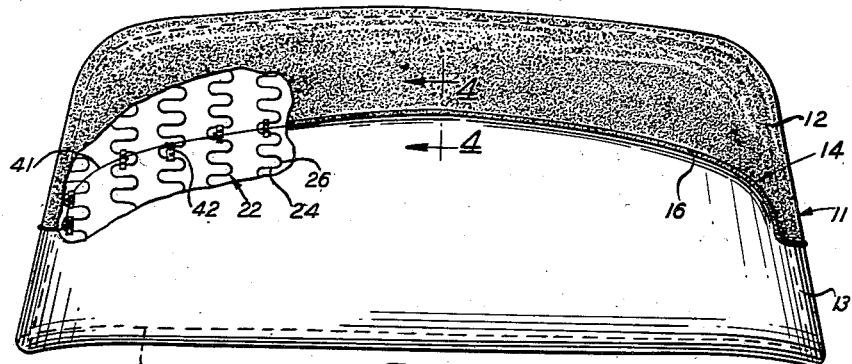
FIG. 1
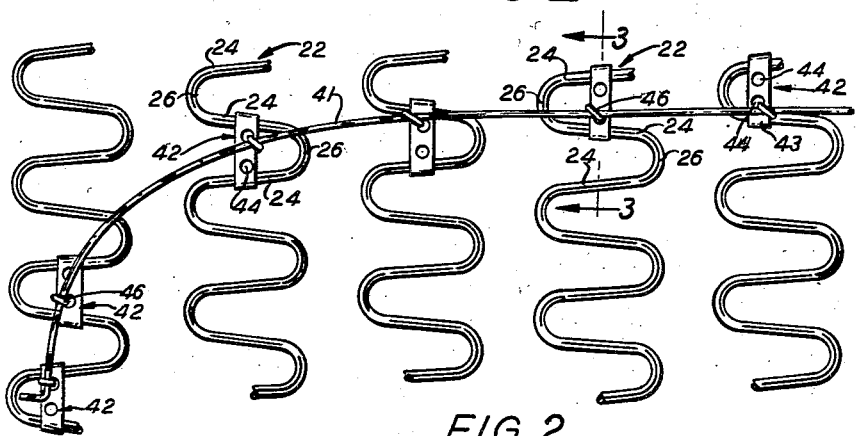
FIG. 2
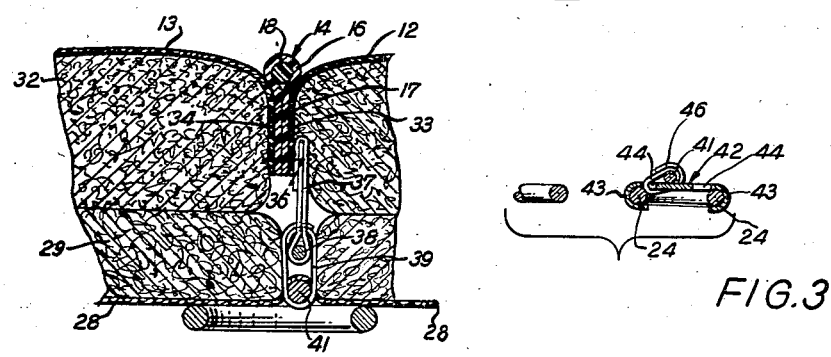
FIG. 3
FIG. 4
M. R. LAITUR
INVENTORS
E. C. McRae
BY J. R. Faulkner
T. H. Oster
ATTORNEY

United States Patent Office 2,781,084
Patented Feb. 12, 1957

2,781,084

VEHICLE SEAT CUSHION

Michael R. Laitur, Plymouth, Mich., assignor to Ford Motor Company, Dearborn, Mich., a corporation of Delaware Application July 2, 1953, Serial No. 365,715

1 Claim. (Cl. 155—179)

This invention relates generally to seat cushions, and more particularly to cushions for motor vehicles incorporating sinuously corrugated wire springs.

Frequently motor vehicle seats are trimmed with two or more different upholstery materials over separate portions of the surface of the cushion, with the materials being separated by means of a heading or welt to provide a pleasing line of demarcation between the different materials. The heading is attached through the padding of the cusion to the seat springs by means of a heavy listing material interconnecting the flange of the heading with a bolster wire which in turn is connected to the seat springs by means of hog rings. In connection with seat springs of the sinuously corrugated type, this construction may be satisfactory for certain arrangements in which the heading between the separated upholstery materials is fairly straight so that the bolster wire can be attached to existing portions of the wire springs. The present application comprises an improvement of this construction in that means are attached to certain portions of the wire springs so that the bolster wire may be satisfactorily connected thereto regardless of the curvature or shape of the heading. In one embodiment that is accomplished by providing flat clips extending lengthwise of the sinuously corrugated wire springs and overlying adjacent straight bar portions of the springs and being provided with crimped return bent end flanges clamping the clips to the springs. The clips are provided with the plurality of longitudinally spaced holes so that hog rings may extend through the holes and around the bolster wire to connect the same thereto. By attaching the clips to suitable pairs of straight bar portions of the various wire springs any desired curvautre of the bolster wire, and consequently of the heading, can be obtained.

Other advantages and objects of this invention will be apparent as this description proceeds, particularly when considered in connection with the accompanying drawings, wherein:

Figure 1 is an elevational view, partly broken away and in section, of a motor vehicle seat cuhsion embodying the present invention.

Figure 2 is an enlarged elevational view of a portion of the construction shown in Figure 1.

Figure 3 is a cross sectional view taken substantially on the plane indicated by the line 3—3 of Figure 2.

Figure 4 is a greatly enlarged fragmentary cross sectional view taken on the plane indicated by the line 4—4 of Figure 1.

Although in the drawings a vehicle seat back is illustrated, the term seat cushion will be utilized in the specification and claim to designate either a seat back or a seat cushion.

Referring now to the drawings, there is shown in Figure 1 a seat cushion 11 for a motor vehicle, the seat being trimmed with a pair of upholstery materials 12 and 13. The upholstery materials 12 and 13 may simply be different fabrics, or one or both may be leather or a vinyl plastic or other suitable upholstery material.

In present practice, the different upholstery materials may meet each other along an irregularly curved line to provide a desired styling effect. As best seen in Figures 1 and 4, the line of demarcation between the upholstery materials 12 and 13 is defined by means of a heading 14 which comprises a narrow cylindrical welt portion 16 and a flange portion 17. The heading in this instance is formed of vinyl plastic wrapped around a cylindrical vinyl core 18 to provide the enlarged cylindrical welt portion 16. If desired, however, the heading may be a single piece formed by extrusion.

The seat cushion 11 is provided with a generally rectangular frame 21, of tubing or other suitable formation, arranged to support a plurality of longitudinally extending laterally spaced wire spring units 22. The spring units 22 comprise sinuously corrugated wire springs each having longitudinally spaced straight bar portions 24 extending laterally of the seat cushion, and interconnected at their ends by looped portions 26 to provide an integral one-piece spring unit of corrugated shape. The individual wire springs 22 are attached at their ends (not shown) to the frame 21 and are properly curved to resiliently support the load impressed upon the seat cushion.

With reference now to Figure 4, the wire springs 22 are covered with a layer of burlap 28 which in turn supports a lower cotton pad 29, an upper cotton pad 32, and finally the upholstery materials 12 and 13. The padding is split in the zone of the heading 14 to permit the flange 17 thereof to extend between the separated portions of the padding, together with the marginal edge portions 33 and 34 of the upholstery material 12 and 13 respectively. The two layers of the flange 17 of the headings 14 and the marginal edge portions 33 and 34 of the upholstery material are stitched together at 36 and are also stitched to the upper edge of a heavy listing 37. The listing material is doubled over to provide a pocket along its lower edge for a wire reinforcement 38, and the latter is interconnected at spaced points by means of hog rings 39 to a bolster wire 41.

The bolster wire 41 is positioned adjacent the upper surfaces of the spring units 22 betwen the spring units and the padding, and is curved to correspond to the curvature and shape of the heading 14. As best seen in Figures 2 and 3, each wire spring unit 22 is provided with a flat clip 42 extending longitudinally of the corrugated wire spring and located substantially centrally of the spring in a lateral direction. The flat clips 42 have return bent end flanges 43 crimped over adjacent straight bar portions 24 of the spring to clamp the clips thereto. Longitudinally of its length the flat portion of each clip 42 is provided with a pair of holes 44 to provide attachment locations for the bolster wire 41. The bolster wire 41 overlies the flat clips 42 and is connected thereto by means of hog rings 46, the hog rings 46 extending through one of the openings 44 in each clip and encircling the bolster wire to attach the latter to the clip.

The flat clips 42 can be attached to any two adjacent straight bar portions 24 of the wire springs 22 by attaching the flat clips to the appropriate pair of bar portions of each wire spring 22, and by attaching the bolster wire to the appropriate hole 24 in each clip the bolster wire can be secured to the wire springs in any desired irregular curvature to conform to the curvature of the heading 14. If desired, as shown at the left hand side of Figure 2, two or more flat clips 42 can be connected to a single wire spring 22, and the clips can be placed off center laterally of the wire spring if desired.

With the bolster wire 41 thus connected to the wire springs in the desired position, the listing 37 can be secured thereto by means of the hog rings 39 which may be connected to the bolster wire at locations intermediate the connections of the bolster wire to the flat clips 42.

The assembly is such that sufficient tension is placed upon the heading 14 so as to depress the upper padding 32 in the zone of the heading so as to provide a joint between the adjacent upholstery material 12 and 13 which is of pleasing appearance.

If desired, additional holes may be provided lengthwise of the flat clips 42 to afford further points of attachment for the bolster wire 41. It will also be noted from Figure 2 that the bolster wire may be located slightly to one side or the other of any particular hole 44 in a flat clip 42 by means of extending the attaching hog ring 46 in the proper direction from the particular hole 44 in the clip.

It will be understood that the invention is not to be limited to the exact construction shown and described, but that various changes and modifications may be made without departing from the spirit and scope of the invention, as defined in the appended claim.

What is claimed is:

In a vehicle seat cushion, a rectangular frame having a transverse dimension extending transversely of the vehicle and a longitudinal dimension extending at right angles thereto, a plurality of generally parallel sinuously corrugated wire springs extending in a direction longitudinally of said frame and being spaced from each other a short distance transversely of said frame, said wire springs having straight bar portions extending transversely of said frame and interconnected by integral end loops, resilient padding overlying said wire springs, upholstery material overlying said padding, a curved heading having a narrow cylindrical welt overlying said upholstery material and an attaching flange extending through separated portions of said upholstery material and said padding, said heading being curved transversely of said frame so that transversely spaced portions of the heading are located in different positions longitudinally of the frame and cross different portions of said sinuously corrugated wire springs, a bolster wire curved to correspond in curvature to the curvature of said heading and positioned between said sinuously corrugated wire springs and said padding, a plurality of flat clips with at least one clip being provided for each of said sinuously corrugated wire springs, each of said flat clips extending longitudinally of said frame and overlying two adjacent straight bar portions of one of said wire springs and having return bent end flanges crimped over the straight bar portions to clamp the clip thereto, the clips secured to the various wire springs being located in different positions on said wire springs longitudinally of said frame and in each instance being located so that the curved bolster wire which crosses each clip within the longitudinal extent thereof, each clip having a plurality of longitudinally spaced holes therein providing a plurality of selective attachment locations for said bolster wire so that one such hole in each clip will intersect or be closely adjacent to the adjacent portion of the curved bolster wire, a hog ring encircling the bolster wire adjacent each clip and extending through the hole in said clip located nearest the intersection of said clip and said bolster wire to anchor the bolster wire to all of the wire springs and to retain the bolster wire in its predetermined curved shape, and a listing strip attached to said bolster wire and to the flange of said heading.

References Cited in the file of this patent

UNITED STATES PATENTS

| | | |
|---|---|---|
| 1,963,710 | Mitchell | June 19, 1934 |
| 2,099,650 | Hall | Nov. 16, 1937 |
| 2,591,185 | Neely | Apr. 1, 1952 |